United States Patent [19]

Nien

[11] Patent Number: 5,727,427
[45] Date of Patent: Mar. 17, 1998

[54] PIVOTABLE HANDLEBAR STEM

[76] Inventor: Chang-jen Nien, 2F-5, No. 229, Chinlung Rd., Neihu Dist., Taipei, Taiwan

[21] Appl. No.: 685,003
[22] Filed: Jul. 22, 1996
[51] Int. Cl.⁶ .......................... B62K 21/12; B62K 21/16
[52] U.S. Cl. ........................... 74/551.3; 74/551.1
[58] Field of Search ............................ 74/551.1–551.3; 280/236, 279; 403/108

[56] References Cited

U.S. PATENT DOCUMENTS

| | | | |
|---|---|---|---|
| 569,354 | 10/1896 | Ryan | 74/551.3 |
| 3,933,373 | 1/1976 | Gammelgaard | 280/278 |
| 4,417,745 | 11/1983 | Shomo | 280/287 |
| 5,144,859 | 9/1992 | Malone | 74/551.3 |
| 5,168,601 | 12/1992 | Liu | 74/551.3 |

FOREIGN PATENT DOCUMENTS 113590  3/1945  Sweden ................ 74/551.3

*Primary Examiner*—Vinh T. Luong
*Attorney, Agent, or Firm*—Foley & Lardner

[57] ABSTRACT

A pivotable handlebar stem for use in a bicycle enables a user to ride on a bicycle normally when the stem is securely engaged with a column. Due to the provision of resilient devices provided within the column and undulating end faces between the engaging face of the column and the stem, the handlebar together with the stem are able to be detachably connected with the column, such that the bicycle will not occupy too much space when parked. The bicycle handlebar stem comprises a column having an extension tube projecting therefrom, the extension tube having a rib formed longitudinally therein, the extension tube also having an apex and two sides each having an opening, a clamp with a first end pivotally connected to a first end of the extension tube, a piston slidably received within the extension tube, the piston having a first end which is securely connected to the clamp, a positioning button securely received within one of the openings, a first resilient element disposed between a bottom face of a recess in the piston and a lower face of the positioning button, and a second resilient element fixedly provided between the rib of the extension tube and a second end of the piston.

3 Claims, 3 Drawing Sheets

PIVOTABLE HANDLEBAR STEM

FIELD OF THE INVENTION

The present invention generally relates to a pivotable handlebar stem, and more particularly to a pivotable handlebar stem especially for use in a bicycle.

BACKGROUND OF THE INVENTION

Conventional bicycles usually have a stem and a handlebar which is securely connected with a first end of the stem by a clamp. The handlebar has a width much greater than a width of the bicycle frame, thus, when the bicycle is not in use and parked in a "Bicycle Parking Lot", it is very hard to squeeze in another bicycle in a limited parking space due to the width of the connected handlebar by a. A user can only turn the handlebar small amount and try his/her best to squeeze in and also will do his/her best to pull the bicycle out from a clutter when he or she needs the bicycle again. Thus it is clear, the bicycle with a conventional stem and a handlebar is very troublesome to park in a confined space.

This invention has a particular application to a pivotable handlebar stem of a bicycle, by which the space occupied by the bicycle to be parked is reduced. The pivotable handlebar stem comprises an inverted "L" shaped stem and a substantially "T" shaped clamp which pivotally connects with the stem through a clamp. A resilient device received within the stem is able to provide a resilient force to the clamp when the bicycle is parked and the clamp is pulled away from its original position. Thereafter, the handlebar can be pivoted to its original horizontal position and again positioned by mating of undulating end faces of the clamp and the stem. When the handlebar of the bicycle is pivoted 90 degrees, it saves a lot of space especially when parking.

Thus, the pivotable handlebar stem of the present invention for use in a bicycle tends to mitigate and/or obviate the aforementioned problems.

SUMMARY OF THE INVENTION

The main objective of the invention is to provide a pivotable handlebar stem comprising a column with an extension tube extending therefrom, the extension tube having a piston slidably received therein and a clamp. An undulating face is formed on free ends of both the extension tube and the clamp. Thus, when the free ends of the extension tube and the clamp are mated, they are securely connected together. A first end of the piston is fixedly connected with the clamp. A resilient device is fixedly provided between a rib of the extension tube and a second end of the piston. A positioning button for preventing accidental turning of the handlebar when the bicycle is being ridden is securely received within one of three holes defined respectively in an apex and two sides of a periphery of the extension tube. When the bicycle is parked, a rider is able to firstly push the positioning button downward to release connection between the extension tube and the piston, and then pull out the clamp and the handlebar from a position wherein they where connected with the extension tube and turn to an angle which is vertical to the horizontal riding position. Because of the resilient device, the clamp is able to recoil back and again securely connect with the extension tube through the undulating faces, but with the handlebar vertical to the horizontal direction.

Another objective of the invention is to provide a pivotable handlebar stem for use in a bicycle which securely locks the extension tube and clamp in a desired position.

Other objects, advantages and novel features of the invention will become more apparent from the following detailed description when taken in conjunction with the accompanying drawings.

BRIEF DESCRIPTION OF THE DRAWINGS

The present invention will now be better understood with reference of the accompanying drawings wherein.

DETAILED DESCRIPTION OF THE PREFERRED EMBODIMENT

Figure 1:
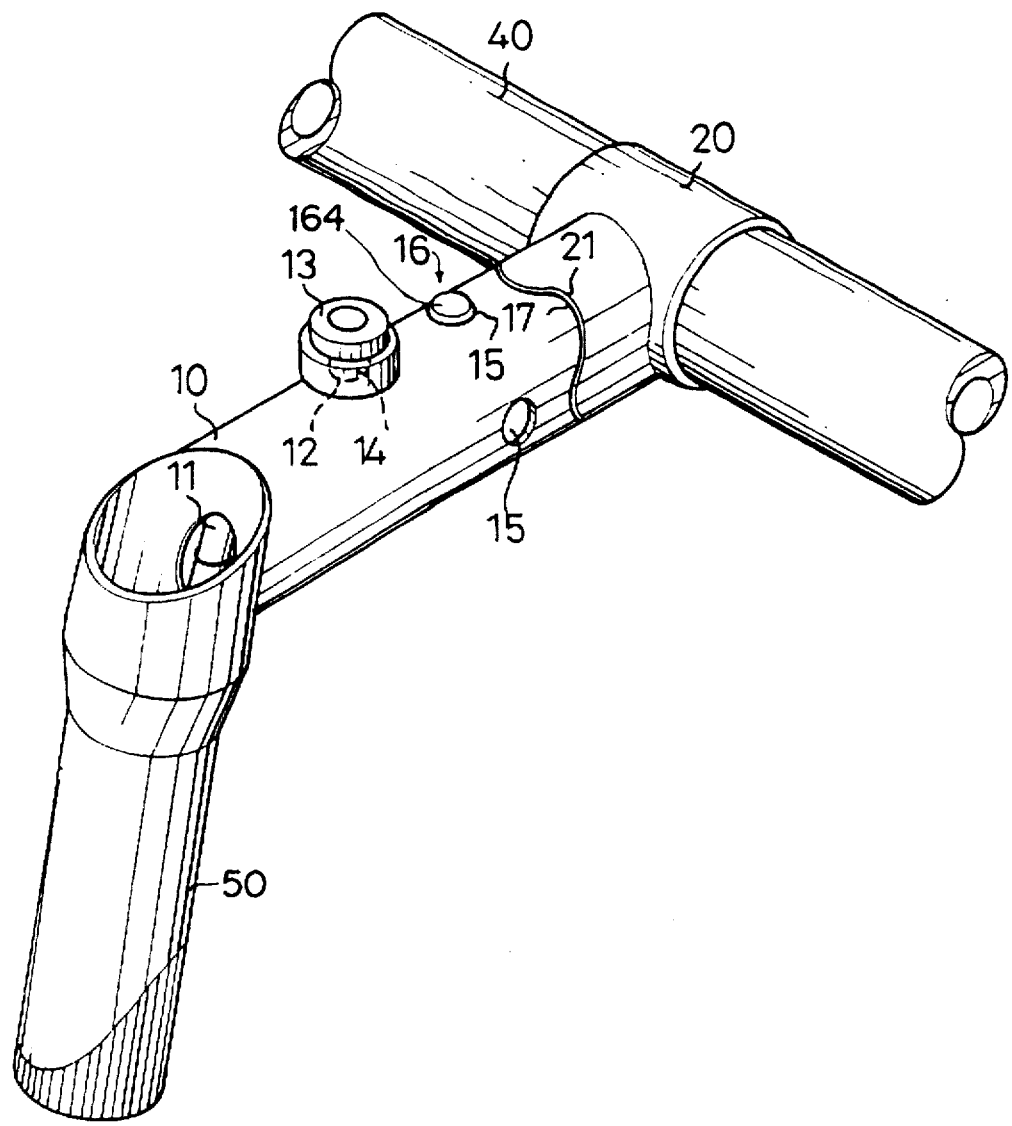
FIG. 1 is a perspective view of a preferred embodiment of a pivotable handlebar stem constructed in accordance with the present invention showing a handlebar in operative engagement with an extension tube 10.
Figure 2:
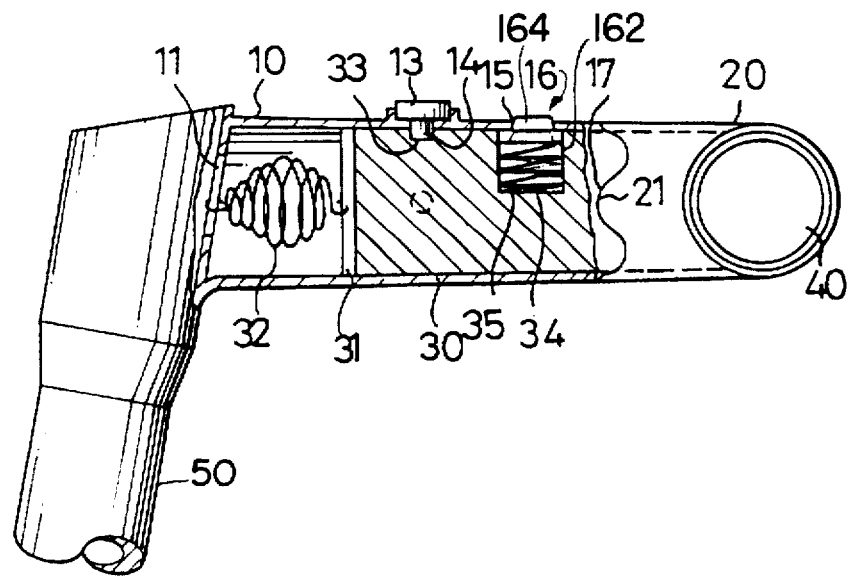
FIG. 2 is a side, elevational, partial cross-sectional view of the preferred embodiment of the present invention as shown in FIG. 1.
Figure 3:
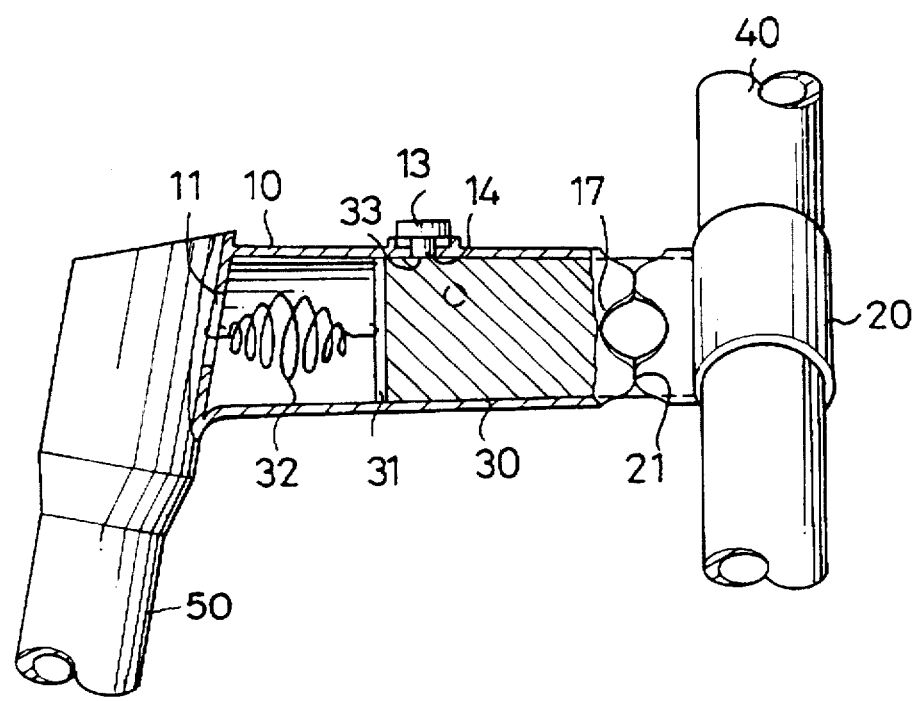
FIG. 3 is another side, elevational partial cross-sectional view of the preferred embodiment of the present invention, wherein the handlebar 40 is shown pulled away from its engaged position and turned approximately 45 degrees.
Figure 4:
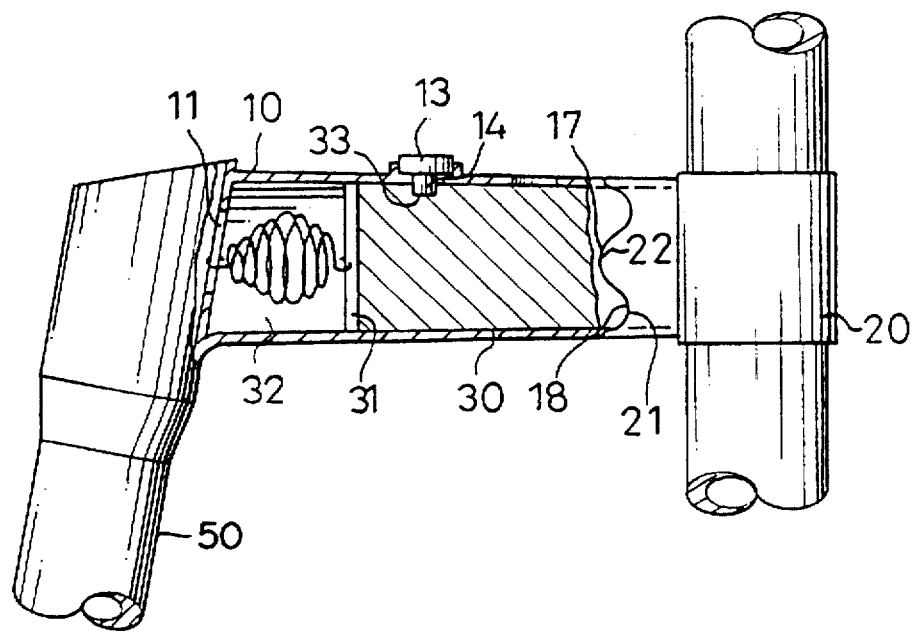
FIG. 4 is another side, elevational partial cross-sectional view of the preferred embodiment of the present invention, wherein the handlebar 40 is shown in an engaged position with the extension tube and turned approximately 90 degrees.

Referring to FIGS. 1 and 2, one preferred embodiment of the invention is shown. A substantially inverted "L" shaped stem constructed in accordance with the present invention comprises a column 50 fixedly connected with a horizontal extension tube 10 having a rib 11 longitudinally formed therein, a substantially "T" shaped clamp 20 and a handlebar 40. A piston 30 is also slidably received within the extension tube 10 and has a first end fixedly received in the clamp 20. In FIGS. 2–4, the extension tube 10 is shown in cross-section whereas the piston 30 is not shown in cross-section. A pivotable handlebar stem 13 having a retaining means extending between said extension tube and said piston in the form of a downward projection 14 is provided on a top periphery of the extension tube 10 for providing a locking effect between the extension tube 10 and the piston 30 when the bicycle is being ridden. That is, the projection 14 of the pivotable handlebar stem 13 extends into a hole 12 defined in the periphery of the extension tube 10 and further extends into a cavity 33 defined in the piston 30. It is preferable that a C-clip is mounted to the projection 14 so that the pivotable handlebar stem 13 may not become easily lost but this is conventional and thus neither shown nor described in detail here.

A positioning button 16 has a body 162 with a smaller tip 164 integrally formed at a top thereof. The tip 164 is receivable in any of three openings 15 respectively defined in an apex and two sides of the extension tube 10. The openings 15 are defined between the hole 12 and the clamp 20 which is mated to a free end 17 of the extension tube 10. Each opening 15 has a diameter smaller than a diameter of the body 162. The periphery of the piston 30 has defined therein a recess 34 configured to receive the positioning button 16. A first resilient element 35, such as a coil spring, is disposed between a bottom face of the recess 34 and a bottom face of the positioning button 16, such that the positioning button 16 is urged upwardly whereby the small tip 164 extends through one of the respectively-aligned openings 15. The small tip 164 may be pressed downwardly by a user's thumbnail to release engagement between the extension 10 and the positioning button 16 and accordingly, the handlebar 40.

The free end 17 of the extension tube 10 and a free end 21 of the clamp 20 each form an undulating end face 18,22 so that they may mate with each other to define a horizontal position (FIGS. 1 and 2) and a vertical position (FIG. 4) of the handlebar 40 which is fixedly retained in the clamp 20.

Referring to FIG. 2, a second resilient element 32, such as an expansion coil spring, has a first end secured to a second end 31 of the piston 30 and a second end secured to the rib 11, whereby once the pivotable handlebar stem 13 has been disengaged from the piston 30 and the positioning button 16 has been depressed, the combined handlebar 40 and the clamp 20 may be pulled away from the rib 11 until the undulating end faces 18,22 of the extension tube 10 and the clamp 20 disengage by effectively being rotated in different directions. Once the desired position of the handlebar 40 is achieved, the coil spring 32 is allowed to urge the piston 30 backward to the rib 11, the positioning button 16 protrudes through a respective one of the openings 15 and the pivotable handlebar stem 13 can be refitted to the piston 30, whereby the handlebar 40 is securely retained in a desired position.

From the foregoing, it is seen that the objects hereinbefore set forth may readily and efficiently be attained, and since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. A pivotable bicycle handlebar stem comprising:

a column having an extension tube projecting therefrom, said extension tube having a rib formed longitudinally therein, said extension tube also having an apex and two sides each having an opening;

a clamp with a first end pivotally connected to a first end of said extension tube;

a piston slidably received within said extension tube, the piston having a first end which is securely connected to said clamp;

a positioning button securely received within one of said openings respectively defined in said apex and said two sides of said extension tube;

a first resilient element disposed between a bottom face of a recess in said piston and a lower face of said positioning button; and a second resilient element fixedly provided between said rib of said extension tube and a second end of said piston.

2. The device as claimed in claim 1 further comprising a locking device having a projection protruding into a periphery of said extension and a periphery of said piston.

3. The device as claimed in claim 1 further comprising undulations formed on said first end of said clamp and corresponding undulations formed on said first end of said extension tube.

* * * * *